May 15, 1923.
N. O. JOHN
1,455,493
DRAWBAR AND POWER ATTACHMENT FOR TRACTORS
Filed July 17, 1922
3 Sheets-Sheet 1
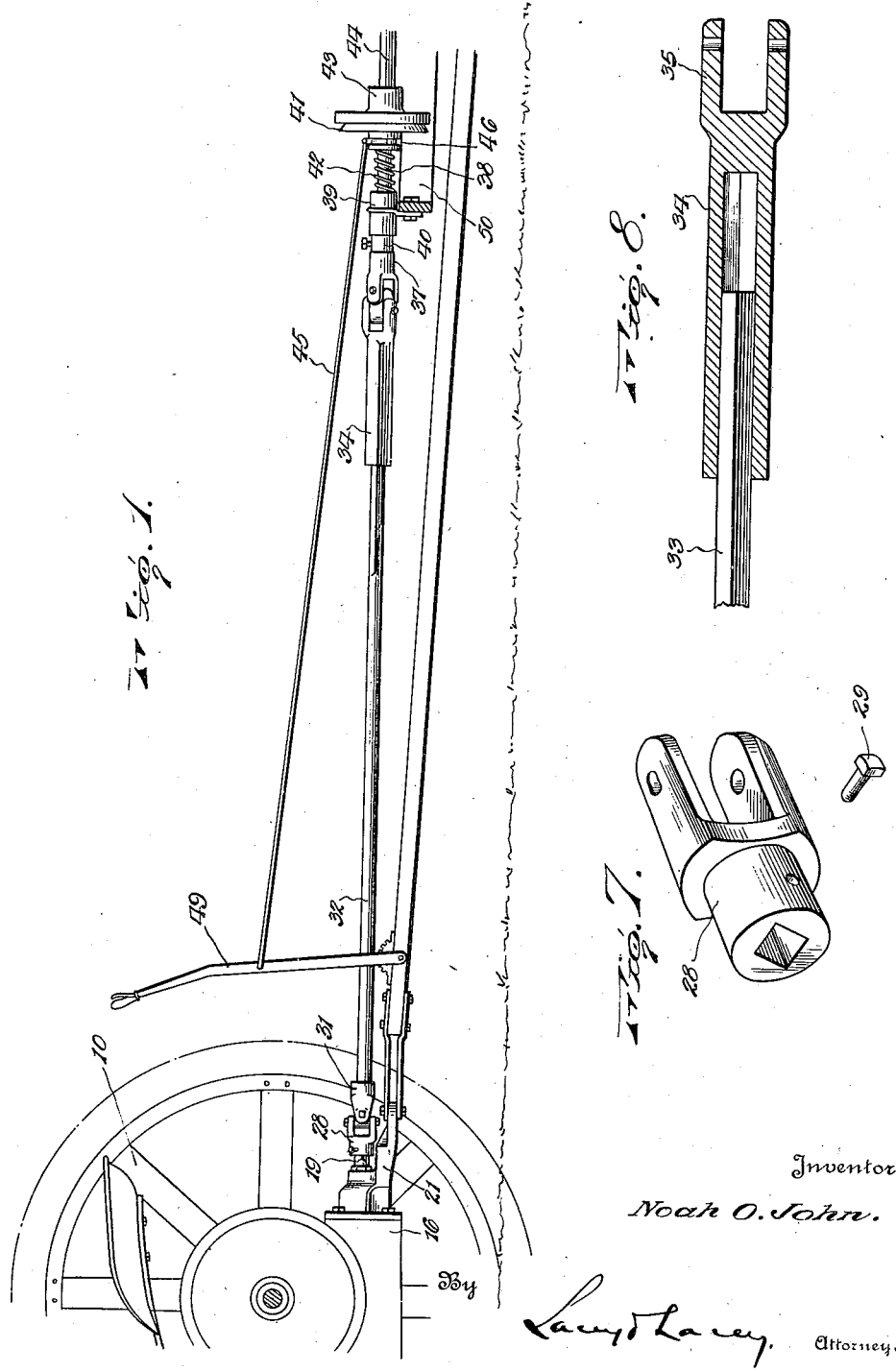
Inventor
Noah O. John.
By Lacey & Lacey, Attorneys

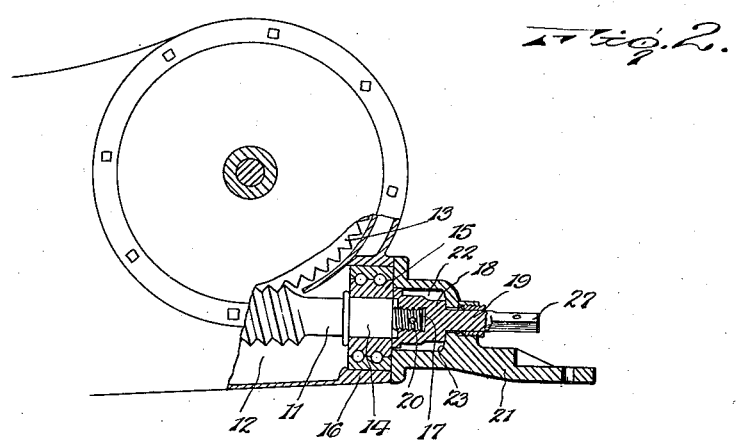
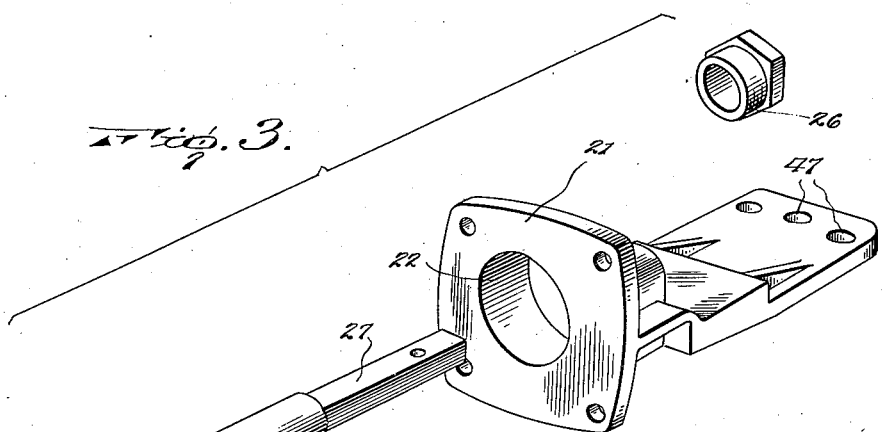
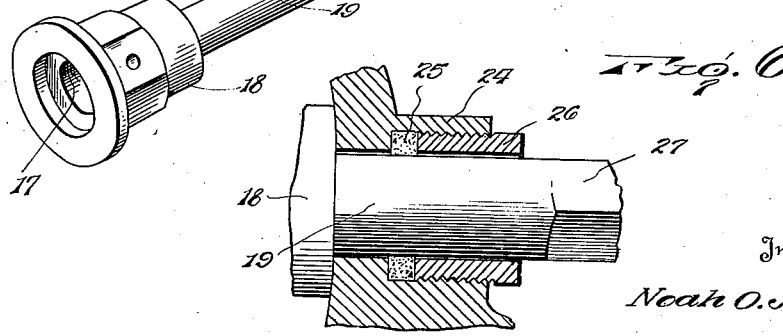

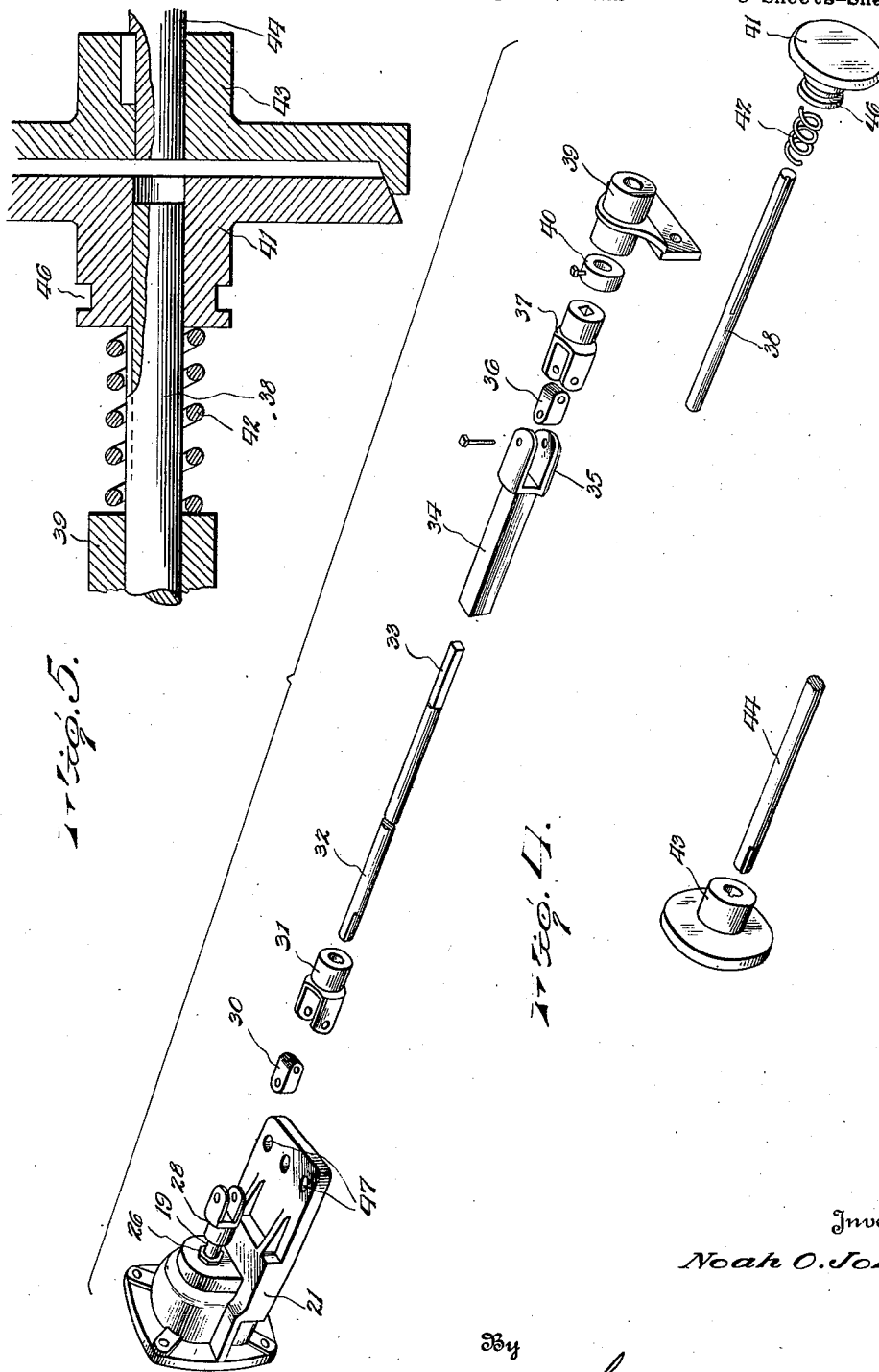

Patented May 15, 1923.

1,455,493

UNITED STATES PATENT OFFICE.

NOAH O. JOHN, OF MARSHALL, OKLAHOMA.

DRAWBAR AND POWER ATTACHMENT FOR TRACTORS.

Application filed July 17, 1922. Serial No. 575,514.

*To all whom it may concern:*

Be it known that I, NOAH O. JOHN, a citizen of the United States, residing at Marshall, in the county of Logan and State of Oklahoma, have invented certain new and useful Improvements in Drawbar and Power Attachments for Tractors, of which the following is a specification.

The present invention relates to an attachment for tractors intended to replace the usual drawbar to which a trailer, such as an agricultural implement is secured, and the object of the invention is to provide an attachment of this character through which motive power furnished by the tractor may be delivered to said implement for operating the latter.

This attachment has ben used for harvesters and grain binders to great advantage and its excellent qualities appear when used on soft ground and no trouble of slipping wheels and leaving patches of wheat standing in the field on low spots will occur.

This attachment may be applied to tractors of any type with slight modifications, but in the accompanying drawings showing one embodiment of the invention, the attachment is presented as used on the Fordson tractor.

In the drawings—

Figure 1 is a side elevation of the device in position on the tractor and the trailer;

Figure 2 is a side elevation in partial section of the drive shaft of the tractor with a portion of the attachment secured thereon;

Figure 3 is a perspective view of some of the details;

Figure 4 is another perspective view of the details laid out in proper order for assembling;

Figure 5 is an axial section of the coupling used;

Figure 6 is a partial section of the drawbar showing the packing box;

Figure 7 is a perspective view of a portion of the knuckle joint;

Figure 8 is an axial section of the telescopic shaft.

The reference numeral 10 represents the rear portion of a Fordson tractor with drive shaft 11 and worm 12 engaging with worm wheel 13 for propelling the tractor. The rear end 14 of the drive shaft 11 constitutes the journal supported in a ball bearing 15 carried in the housing 16. The extreme end of the drive shaft 11 is threaded, as at 17, to receive the socket 18 of the short socket shaft 19. A pin 20 locks the socket 18 to the threaded end 17 of the drive shaft 11.

To the rear end of the housing 16 is secured by bolts or the like the drawbar 21 formed with a chamber 22 in which the socket 18 is enclosed and held in position between the inner wall 23 of the chamber and the rear face of the ball bearing 15. Around the outer end of the socket shaft 19 is formed a packing box 24 containing a Garlock or any other suitable packing 25 compressed by means of a nut 26. The rear end 27 of the socket shaft 18 is preferably square and adapted to receive one link 28 of a knuckle joint which is pinned fast on the square end 27 by a pin or set screw 29, Figure 7. The knuckle joint also includes a central block 30 and a second link 31 which are pinned together in the usual manner and providing movement in all directions. This second link 31 is keyed to one end of the telescopic shaft 32 which has its other end 33 keyed in the sleeve 34 to provide axial displacement between the parts. The other end of the sleeve 34 is bifurcated, as at 35, to receive the central block 36 similar to the block already described and pinned to the sleeve 35 as well as to the third link 37 so as to provide a universal joint at the end of the telescopic joint.

This last knuckle joint link 37 is secured on the end of the stub shaft 38 which is carried in a bearing block 39 secured on the trailer 50, as seen in Figure 1. The collar 40 is inserted between the link 37 and the forward end of the bearing block 39 in order to retain the stub shaft 38 in proper position. At the other end of the stub shaft 38 is slidably but non-revolubly mounted the member 41 of a clutch and a coiled spring 42 is carried on the stub shaft 38 between the rear end of the bearing bracket 39 and the forward end of the clutch member 41 in order to continuously place the clutch member 41 in engagement with its corresponding clutch member 43. This latter clutch member is secured on the actuating shaft 44 of the trailer and a clutch releasing rod 45 is provided for disengaging the clutch in order to stop the operation of the trailer. For this purpose, the clutch member 41 is provided with a groove 46 engaging with the clutch releasing rod 45, the latter being actuated from the tractor by an operating lever 49.

When the device is used for operating, for instance, a harvesting machine, the latter is coupled to the drawbar 21 in the usual manner, the latter being provided with a plurality of apertures 47 for a pintle. With the clutch and sleeve 34 and the intermediate parts attached to the trailer 50, a connection between the latter and the tractor for driving purposes is easily obtained by inserting the telescopic shaft 32 in the sleeve 34, the distance between the tractor and trailer being immaterial as long as sufficient engagement between the telescopic shaft 32 and the sleeve 34 exists for revolving the latter.

It will now be evident that, as soon as the tractor is started in forward direction, the clutch 41, 43 may be thrown in at any moment for operating the harvester and that it is possible to operate the trailer satisfactorily even when turning a sharp corner or traveling over hilly ground without interfering with the operation as the telescopic shaft together with the knuckle joints will permit substantially any angular position horizontally or vertically between the tractor and the trailer.

It should be noted that the clutch will only operate in one direction as it is unnecessary to reverse the harvester or other agricultural implement.

Having thus described the invention, what is claimed as new is:

1. The combination with a tractor having a drive shaft and a housing therefor, of a drawbar for a trailing implement rigidly secured to said housing, a revoluble member mounted in said drawbar and having positive connection with said drive shaft, flexible means connecting said member with the actuating shaft of said implement, said means including a clutch at the adjacent end of said actuating shaft, and a telescopic shaft having a knuckle joint at each end one of said knuckle joints being inserted between said member and said telescopic shaft, a bearing bracket on said implement and a stub shaft mounted in said bearing bracket and having slidable connection with said clutch.

2. The combination with a tractor having a drive shaft and a housing therefor, of a drawbar for a trailing implement rigidly secured to said housing, a revoluble member mounted in said drawbar and having positive connection with said drive shaft, flexible means connecting said member with the actuating shaft of said implement, said means including a clutch at the adjacent end of said actuating shaft, and a telescopic shaft having a knuckle joint at each end, one of said knuckle joints being inserted between said member and said telescopic shaft.

3. The combination with a tractor having a drive shaft and a housing therefor, of a drawbar for a trailing implement rigidly secured to said housing, a revoluble member mounted in said drawbar and having positive connection with said drive shaft, flexible means connecting said member with the actuating shaft of said implement, said means including a clutch at the adjacent end of said actuating shaft, a telescopic shaft having a knuckle joint at each end, one of said knuckle joints being inserted between said member and said telescopic shaft, a bearing bracket on said implement, and a stub shaft mounted in said bearing bracket and having slidable connection with said clutch and a spring between said bearing bracket and said clutch adapted to hold the latter in engagement.

4. The combination with a tractor having a drive shaft and a housing therefor, of a drawbar for a trailing implement rigidly secured to said housing, a revoluble member mounted in said drawbar and having positive connection with said drive shaft, flexible means connecting said member with the actuating shaft of said implement, said means including a clutch at the adjacent end of said actuating shaft, a telescopic shaft having a knuckle joint at each end, one of said knuckle joints being inserted between said member and said telescopic shaft, a bearing bracket on said implement, a stub shaft mounted in said bearing bracket and having slidable connection with said clutch, and a spring between said bearing bracket and said clutch adapted to hold the latter and said clutch adapted to hold the latter in engagement, the other of said knuckle joints connecting said stub shaft with said telescopic shaft.

In testimony whereof I affix my signature.

NOAH O. JOHN. [L. S.]